United States Patent [19]

Leuca et al.

[11] Patent Number: 5,574,776
[45] Date of Patent: Nov. 12, 1996

[54] CALL REDIRECTION FEATURE FOR RELAY SERVICES

[75] Inventors: Ileana A. Leuca, Highland Park; Alfred E. Vitalo, Red Bank, both of N.J.

[73] Assignee: Lucent Technologies Inc., Murray Hill, N.J.

[21] Appl. No.: 166,130

[22] Filed: Dec. 13, 1993

[51] Int. Cl.⁶ .................................................. H04M 15/00
[52] U.S. Cl. ........................ 379/113; 379/111; 379/112; 379/115; 379/130; 379/133; 379/134
[58] Field of Search ................................. 379/52, 199, 211, 379/396, 94, 100, 96, 97, 98, 142, 144, 111–115, 133, 134, 130

[56] References Cited

U.S. PATENT DOCUMENTS

| | | | |
|---|---|---|---|
| 4,266,098 | 5/1981 | Novak | 379/199 |
| 4,860,347 | 8/1989 | Costello | 379/199 |
| 5,018,191 | 5/1991 | Catron et al. | 379/211 |
| 5,033,079 | 7/1991 | Craton et al. | 379/211 |
| 5,048,076 | 9/1991 | Maurer | 379/94 |
| 5,056,132 | 10/1991 | Coleman | 379/100 |
| 5,062,133 | 10/1991 | Melrose | 379/94 |
| 5,081,673 | 1/1992 | Engelke | 379/52 |
| 5,086,458 | 2/1992 | Bowen | 379/180 |
| 5,121,421 | 6/1992 | Alheim | 379/52 |
| 5,200,988 | 4/1993 | Riskin | 379/96 |
| 5,253,285 | 10/1993 | Alheim | 379/52 |
| 5,289,523 | 2/1994 | Vasile | 379/52 |
| 5,325,417 | 6/1994 | Engelke et al. | 379/52 |
| 5,327,479 | 7/1994 | Engelke et al. | 379/52 |
| 5,396,536 | 3/1995 | Yudkowsky | 379/98 |

FOREIGN PATENT DOCUMENTS

| | | | |
|---|---|---|---|
| 0576205 | 12/1993 | European Pat. Off. | 379/52 |
| 3019554 | 9/1993 | WIPO | 379/52 |

*Primary Examiner*—Wellington Chin
*Assistant Examiner*—Vijay Shankar
*Attorney, Agent, or Firm*—Frederick B. Luludis

[57] ABSTRACT

A telecommunications network is arranged to provide equal access to a user of a text telephone device, such that a TDD user may dial directly a desired telephone number, without having to first place a call to a so-called relay center and directing the relay center to dial the desired telephone number.

10 Claims, 1 Drawing Sheet

CALL REDIRECTION FEATURE FOR RELAY SERVICES

FIELD OF THE INVENTION

The invention relates to providing a sound-impaired user of a Text Telephone Device (TDD) with equal access to a telecommunications network.

BACKGROUND OF THE INVENTION

A person who uses a TDD typically suffers from a hearing and/or sound impairment. To place a call to a person who is not so impaired, a TDD user has to (a) dial via the TDD an 800 service telephone number associated with a so-called relay service and (b) then send via the TDD the telephone number of the unimpaired person. The relay service responsive thereto places a call to the entered telephone number and then bridges the latter call with the TDD call by translating text entered via the TDD into speech for presentation to the unimpaired person and translating a spoken response into text for presentation to the TDD user. It can be appreciated from the foregoing that a call from the unimpaired person to the TDD user would also be placed via the relay service. Moreover, if the TDD user has a need to access other telephone services, such as directory assistance, alternate billing (e.g., collect call), or any other operator service, then such access needs to be placed via the aforementioned relay service so that the TDD user's request may be translated accordingly.

It can be appreciated from the foregoing that in most instances, other than, e.g., placing a call to another TDD user, a TDD user does not have the same level of access to a telecommunications network as a nonTDD user does, since a TDD user has to place most of his/her calls through a relay service. In this respect, a TDD user is not provided with equal access to a telecommunications network, as mentioned above.

SUMMARY OF THE INVENTION

We have recognized that a TDD user may enjoy equal access to a telecommunications network by simply arranging the network so that it tracks, in accord with an aspect of the invention, whether the calling and called devices (e.g., station set, TDD, etc.) are functionally compatible with one another and directs a call to a relay service only if such devices are incompatible. We have further recognized that the so-called ii digits of a caller's ANI may be used, in accord with an aspect of the invention, as a mechanism for tracking such compatibility and thus provide such equal access. Specifically, if, in accord with an aspect of the invention, the ii digits associated with the calling and called station devices indicate that the devices are compatible with one another, then the associated call may be forwarded directly to the called station. If not, then the call is redirected to a particular service, e.g., a relay service, so that the call may be processed in a way to account for such incompatibility. However, in practically most instances the TDD user is provided with equal dialing access and is only linked to a relay service when the ii digits respectively associated with the calling and called stations reflect such incompatibility.

DETAILED DESCRIPTION

Figure 1:
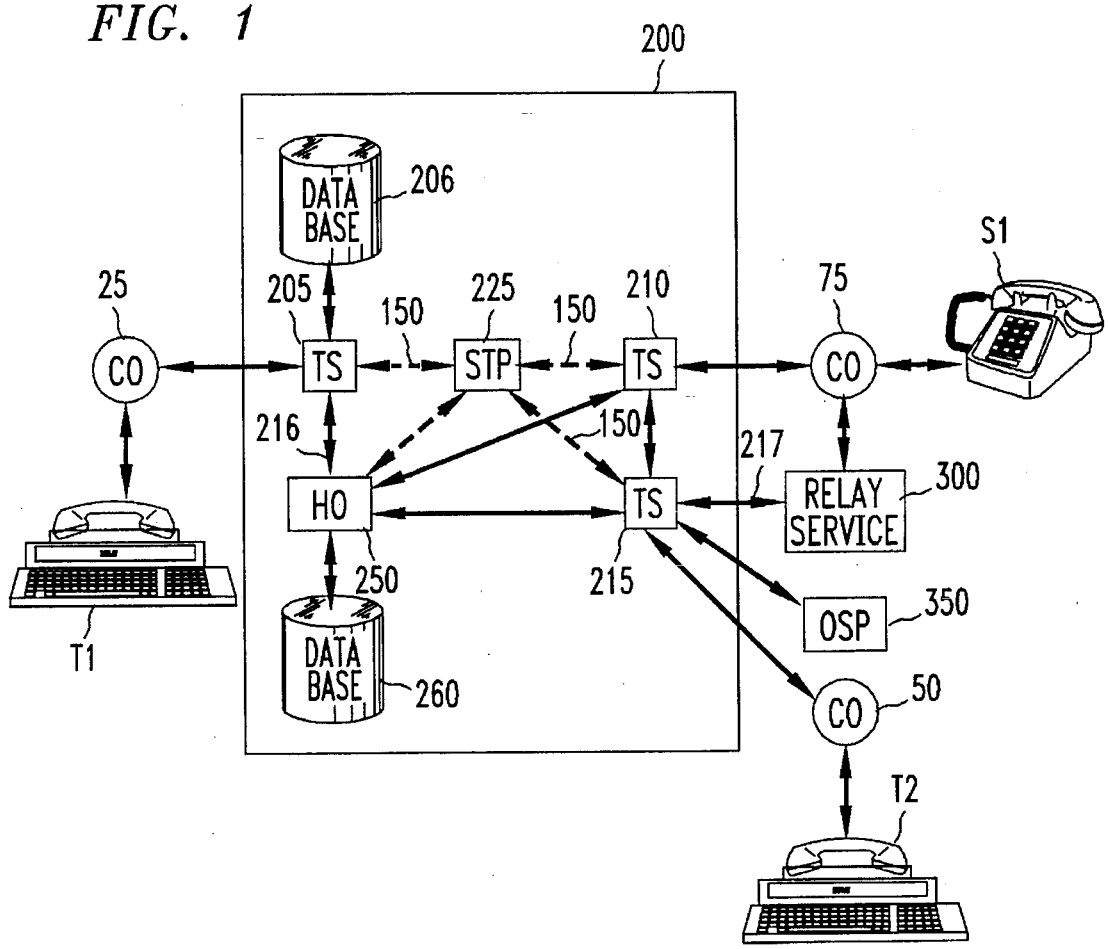
FIG. 1 illustrates a telecommunications network in which the principles of the invention may be practiced.

In an illustrative embodiment of the invention, telecommunications network 200, FIG. 1, includes, inter alia, a plurality of interconnected toll switching (TS) offices, three of which are shown in the FIG. namely, TS 205, TS 210 and TS 215. Such toll switches, which may be, for example, the well-known NO. 4ESS switch available from AT&T, are also interconnected via the well-known Common Channel Signaling (CCS) network 150. The toll switches use CCS network 150 and signal transfer point (STP) 225 to exchange data messages with one another in order to establish a telephone connection from an originating toll switch, e.g., TS 205 to a destination toll switch, e.g., TS 210. Network 200 also includes a so-called Hand-Off (HO) switch 250, which may be, for example, the aforementioned No. 4ESS switch, and which operates to provide special call handling functions. That is, if a toll switch determines that a call needs to be processed in accordance with some special call processing function then the toll switch forwards the call to the appropriate HO switch so that the call may be processed in accord with the determined function.

Figure 2:
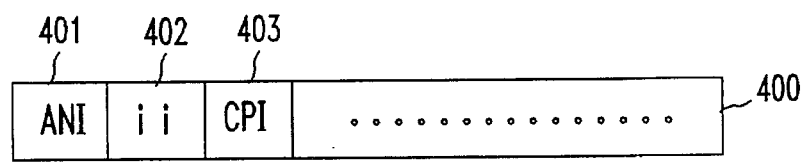
FIG. 2 illustrates a layout of a data record that is associated with a telephone caller in which the data record is stored in a database associated with the HandOff (HO) switch of FIG. 1.

More specifically, assume that the user of TDD T1 desires to place a call to conventional station set S1 associated with a voice user. The user of TDD T1 may do so, in accord with the invention, by dialing directly the telephone number of station S1, rather than the telephone number of a relay service as was priorly done. Local Central Office (CO) 25, responsive thereto, collects the dialed digits, identifies the calling party's interexchange carrier, which in the present case is assumed to be network 200, and forwards the call as well as the called telephone number, caller's ANI including the associated ii digits, to TS 205. TS 205, responsive to receipt of the call, accesses its associated local database 206 using the caller's ANI to determine if the caller subscribes to the inventive calling service. If that is not the case, then the call is processed in a conventional manner. Otherwise, TS 205 forwards the call to HO switch 250. That is, TS 205 forwards the call via communications path 216 and forwards the call data (Caller's ANI, ii digits, called number, and service type indicator) associated with the call via CCS network 150 and Signal Transfer Point 225. Responsive to receipt of the call and associated call data (information), HO switch 250 accesses its associated database 260 to obtain data records associated with the calling and called numbers, respectively. An illustrative example of such a record is shown in FIG. 2.

Specifically, a data record comprises a number of fields including fields 401 through 403 for respectfully storing the associated ANI, ii digits (or code) and a Communications Protocol Indicator (CPI). For a TDD device, the ii field of the associated record may contain a value of 60, 66 or 67 based on the type of billing that is applied to telephone calls originating over the telephone line connected to the particular TDD. For example, a value of 60 indicates that the associated telephone line is a plain old telephone line and calls originating over that line are to be billed accordingly.

A value of 66 indicates that the telephone line is a hotel telephone line that requires real time billing, and a value of 67 indicates that a billing restriction is associated with the particular telephone line, in which the ANI for that telephone line is stored in the associated ANI field. As will be discussed below, the CPI indicator identifies the communications protocol employed by the associated station. Such protocols include Baudot, ASCII, speech, facsimile (G3 or G4), etc.

Returning to FIG. 1, HO switch 250 then compares the ii digits contained in the records obtained from database 260. If the ii digits for the calling party match the ii digits for the called party, then HO switch 250 in a conventional manner forwards the call towards its intended destination. If they do not match, then HO switch 250 forwards the call to TS 215 along with a routing number indicating that the call is to be forwarded to relay service 300. TS 215, in turn, routes the call and the associated calling information to relay service 300, whereat the calling information is displayed on the display of a terminal operated by a relay service attendant. In forwarding the call, HO switch 250 also includes the contents of the CPI field of the associated record in the call information that is delivered to relay service 300. Relay service 300, in response to receipt of the call and associated call information, establishes, in a conventional manner and via CO 75, a call connection to conventional station set S1. The service attendant then bridges the incoming and outgoing calls and performs a translation function, i.e., translating speech into text for delivery to TDD T1 and translating text from TDD T1 into speech for delivery to voice station set S1.

Thus, in accord with an aspect of the invention, TDD T1 is provided with equal access to network 200 and therefore may place a call to another party by dialing directly the telephone number of that party, rather than the telephone number associated with a relay service, e.g., relay service 300.

If the above-described call originated from station S1, then TS 210 recognizes that station S 1 subscribes to the inventive service and forwards the call to HO switch 250. As before, switch 250 then routes the call to relay service 300 since the ii digits associated with the station S1 telephone number would be different from the ii digits associated with TDD T1 telephone number. However, in the instance where station S1 places a call to another voice type station set, then the ii digits for the calling and called stations would match and the call would be forwarded directly to the called station, as is done conventionally.

Assume at this point that the user of TDD TI places a call to TDD T2. When the call arrives at HO switch 250 and switch 250 obtains the database 260 records for the calling and called telephone stations then, as mentioned above, switch 250 will find that the values of those ii digits match and, therefore, forwards the call to TDD T2 via TS 215 if the contents of the CPI fields of those records also match. Upon receipt of the call, TS 215 then forwards the call directly to TDD T2 via CO 50. If, however, the CPI fields do not match, indicating that the calling and called devices use different communications protocols, than the call is forwarded to relay service 300, in the manner discussed above.

In the event that the TDD T1 user desires to obtain operator services, then all that the user needs to do is place a 0+ call as is done conventionally. In such an instance, CO 25 responsive to the dialed digit 0 forwards the call to TS 205, even though TS 205 is not a so-called Operator Service Position System which handles operator services calls. More particularly, when CO 25 translates the caller's ANI to determine the caller's interexchange carrier for operator services, then the results of the translation will identify TS 205. Accordingly, CO 25 forwards the call to TS 205. Thus, calls originating at a TDD are routed to the same toll switch, e.g., TS 205. TS 205 responsive to receipt of the call and resulting database 206 lookup, forwards the call to HO switch 250. Similarly, HO switch 250 obtains the record for the calling number from database 260 and then forwards the call via TS 215 to a special operator services platform OSP 350 that is designed to provide operator services to subscribers that are sound impaired. In forwarding the call, HO 250 includes the contents of the CPI field of the associated record in the call information for delivery to OSP 350 so that the latter may use the proper communications protocol when communicating with TDD T1.

The foregoing is merely illustrative of the principles of the invention. Those skilled in the an will be able to devise numerous arrangements, which, although not explicitly shown or described herein, nevertheless embody those principles that are within the spirit and scope of the invention. For example, although the foregoing was discussed in terms of TDD type calls, it is apparent that the claimed invention may be used in other telephone calling arrangements, such as facsimile calls. That is, in a facsimile call if the ii digits for the calling and called numbers do not match—meaning that the calling and called devices are not compatible—then the call is either not completed, or redirected to a special platform that is adapted to reconcile the problem. As another example, the function performed by HO switch 250 may be implemented in each toll switch. As another example, in multimedia services the ii digits may be used to determine if voice and data paths need to be established between the calling and called parties. That is, if a call is placed via a so-called video telephone to a conventional telephone station set, then the network element processing the call only needs to establish a voice path since the ii digits of the called device will indicate that it is not a video device.

We claim:

1. A method of processing a call in a telephone network comprising the steps of associating different types of telephone devices capable of placing and receiving telephone calls via said telephone network with respective codes, and responsive to receipt of a telephone call from a calling device to a called device, comparing the codes associated with said calling and called devices and establishing either a direct telephone connection between the calling and called devices if the codes match or an indirect telephone connection via service platform if the codes do not match.

2. The method set forth in claim 1 wherein said calling device is a text telephone device and said service platform is a telecommunications relay services platform.

3. The method set forth in claim 1 wherein each of said device connects to said telephone network via a telephone line associated with an Automatic Identification value (ANI), said ANI including ii digits having a value indicative of the type of telephone device connected to the associated telephone line, and wherein said codes are the values of the ii digits associated with the telephone lines respectively connected to said telephone devices.

4. The claim set forth in claim 3 wherein the value of the ii digits for a text telephone device is 60, 66 or 67 based on a type of billing applied to telephone calls originating over the telephone line connected to the text telephone device.

5. The claim set forth in claim 4 wherein when said value is 60 then said telephone line is a plain old telephone line, 66 then said telephone line is a hotel telephone line requiring real time billing, or 67 then said telephone line is associated with a billing restriction (e.g., a call can only be charged to a credit card).

6. A method of processing telephone calls in a telecommunications network comprising the steps of responsive to a receipt of a telephone call requested by a calling telephone device, determining if the calling telephone device is functionally compatible with a called telephone device and forwarding said telephone call directly to said called telephone device if said calling and called telephone devices are found to be compatible with one another, and responsive to said calling and called telephone devices not being functionally compatible with one another, then forwarding said telephone call to a telephone service platform for further processing.

7. The method set forth in claim 6 wherein said calling telephone device is a text telephone device and said telephone service platform is a telecommunications relay services platform.

8. The method set forth in claim 6 wherein said calling and called telephone devices are associated with respective codes having values indicative of the identity of the telephone line respectively connected to associated telephone device.

9. The claim set forth in claim 8 wherein each of said devices connects to said telephone network via a telephone line associated with an Automatic Identification value (ANI), said ANI including ii digits having a value indicative of the type of telephone device connected to the associated telephone line, and wherein said codes are said ii digits and wherein the value of the ii digits for a text telephone device is 60, 66 or 67 based on a type of billing applied to telephone calls originating over the telephone line connected to the text telephone device.

10. The claim set forth in claim 9 wherein when said value is 60 then said telephone line is a plain old telephone line, 66 then said telephone line is a hotel telephone line requiring real time billing, or 67 then said telephone line is associated with a billing restriction (e.g., a call can only be charged to a credit card).

* * * * *